Oct. 15, 1963 C. W. SMITH 3,107,132
ELECTRICAL DISTRIBUTION DEVICE
Filed March 30, 1959 4 Sheets-Sheet 1

INVENTOR.
Charles W. Smith
BY
Shoemaker & Mattare
ATTYS

Oct. 15, 1963                    C. W. SMITH                    3,107,132
                        ELECTRICAL DISTRIBUTION DEVICE
Filed March 30, 1959                                        4 Sheets-Sheet 2
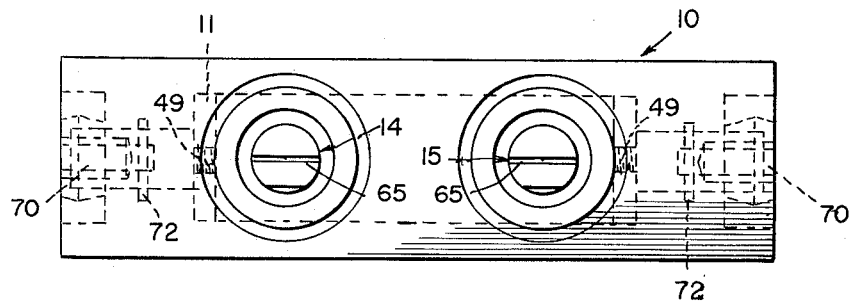
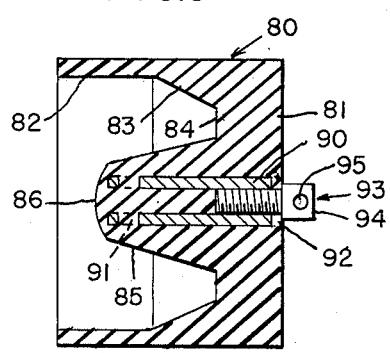
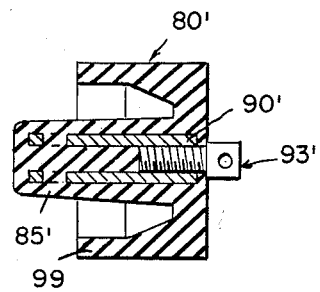
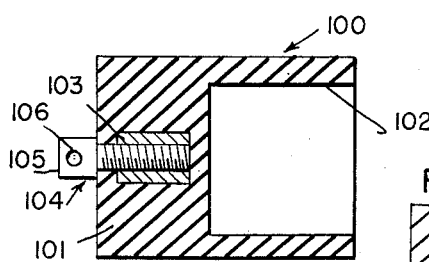
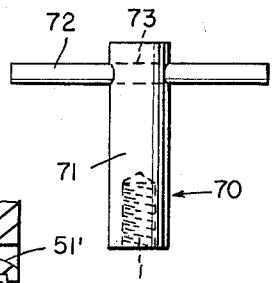
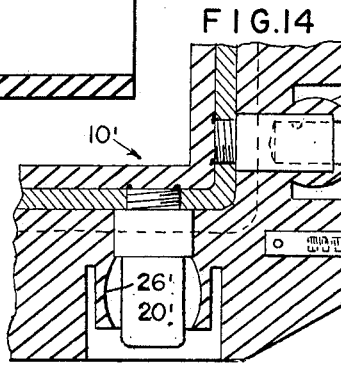
INVENTOR.
Charles W. Smith
BY
Shoemaker & Mattare
ATTYS Oct. 15, 1963 C. W. SMITH 3,107,132
ELECTRICAL DISTRIBUTION DEVICE
Filed March 30, 1959 4 Sheets-Sheet 3
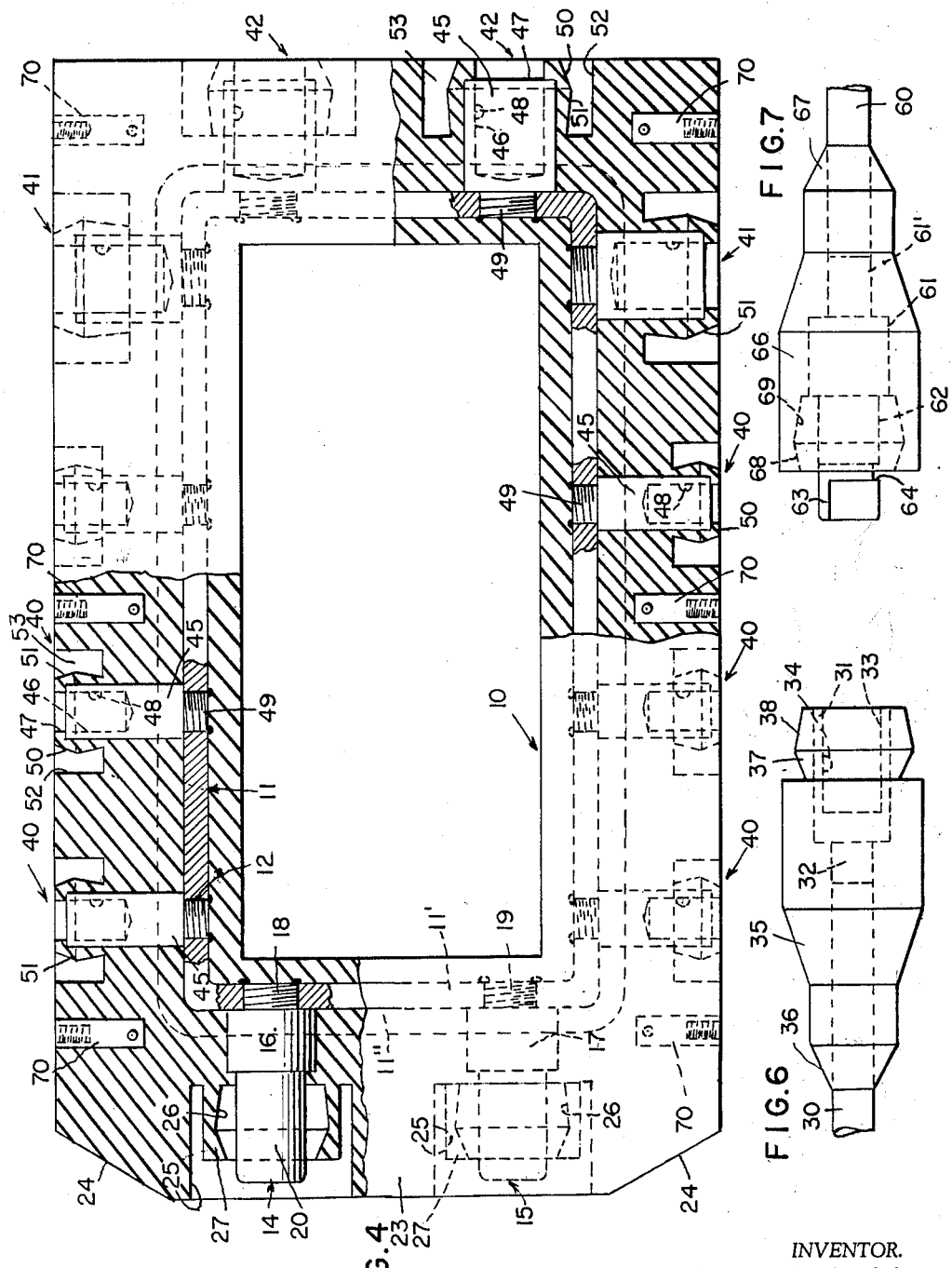
INVENTOR.
Charles W. Smith
BY
Shoemaker + Mattare
ATTYS Oct. 15, 1963     C. W. SMITH     3,107,132
ELECTRICAL DISTRIBUTION DEVICE
Filed March 30, 1959     4 Sheets-Sheet 4
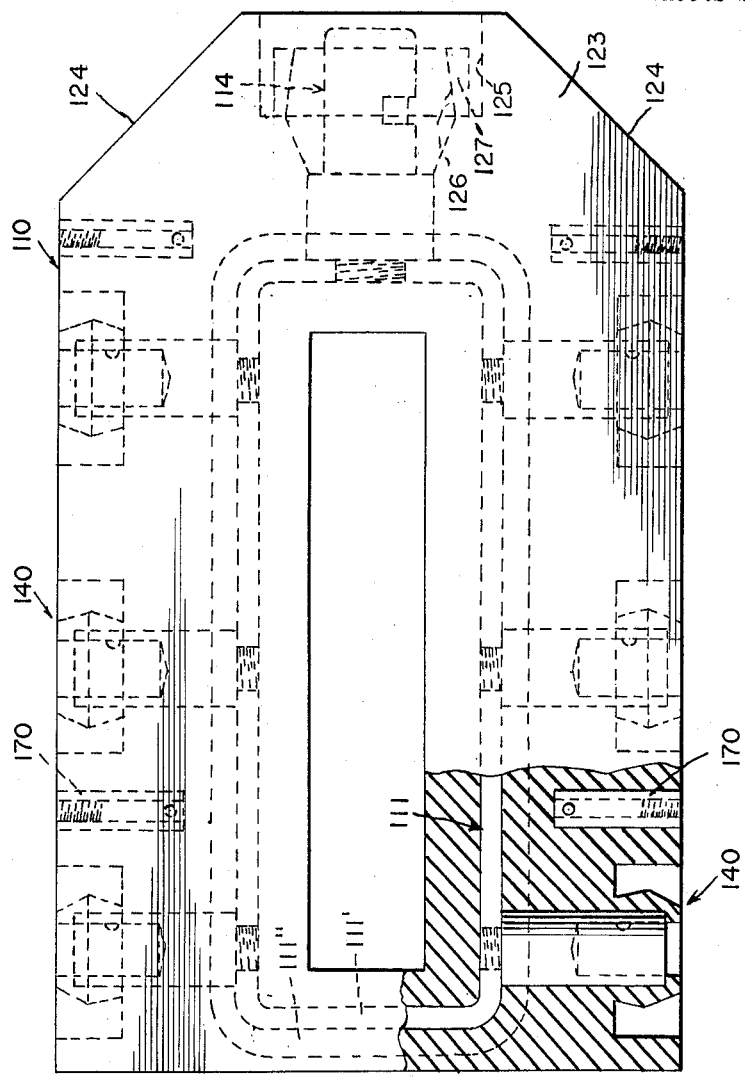
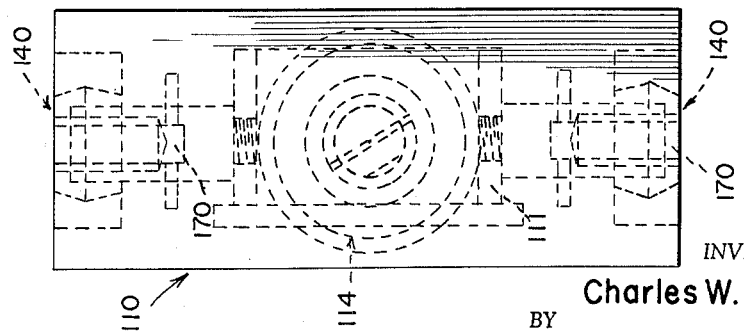
INVENTOR.
Charles W. Smith
BY
Shoemaker & Mattare
ATTYS

United States Patent Office 3,107,132
Patented Oct. 15, 1963

3,107,132
ELECTRICAL DISTRIBUTION DEVICE
Charles W. Smith, Hamlet Hill, Salisbury, Conn.
Filed Mar. 30, 1959, Ser. No. 802,832
2 Claims. (Cl. 339—60)

The present invention relates to a new and novel electrical distribution device, and more particularly to a distribution device including one or more electrical inlets and a plurality of electrical outlets whereby the electrical energy from a single source may be distributed to a plurality of locations.

The present invention is particularly adapted for use in constant potential multi-operator welding systems. This type of system has, in recent years, become more and more popular particularly in connection with shipbuilding operations wherein an extensive amount of welding is required in a plurality of widely spaced locations. The development of semiconductor rectifier elements has made such constant potential welding systems practical.

Multi-operator welding systems are advantageous because they provide highest welding quality while having a lower initial cost than single operator welders, and maintenance is reduced to a minimum. Multioperator systems are quite compact and highly portable and, in general, have a long life expectancy and may be utilized in many various applications, thereby providing the highest degree of versatility in welding operations. Such multi-operator welding systems are generally economically feasible with a minimum of approximately twenty arcs, and of course the more arcs which are required, the greater the efficiency and economy of a constant potential multioperator system. This type of system is also especially well suited for use where the amount of space is limited and a concentration of arcs is required in a particular area.

An important and fundamental concept of multi-operator welding systems is the fact that many arcs are operated in parallel utilizing what is known as the "diversity factor." By use of parallel operation, the inherent flexibility of the system results in an appreciable gain in the number of welding arcs and a resultant lower cost per arc. The so-called "diversity factor" is the distribution or diversity of the welding load on the equipment between the welding operators at any time. The welding duty cycle, or the time when a particular arc is actually being used for welding, is not continuous, and in fact it is extremely difficult for a welder to attain as much as a 50% duty cycle over any extended period of time, or in other words, the welding arc would not be employed more than 50% of the time. It is evident that a certain amount of time is required for the welder to set up the work and replace the electrodes and so forth, thereby as a practical matter making it impossible for the welder to be employing the welding arc at all times. Actual tests and checks in many industries on all kinds of production welding have shown that a 25% duty cycle is about average on manual coated electrode welding, thereby indicating that the welding arc is employed by each individual welder only approximately 25% of the time.

The constant potential multi-operator system takes into account the 25% normal duty cycle and also the fact that a plurality of operators, for example thirty in number, operating from a single power source will not be welding at the same time. This second fact is the load distribution factor or the diversity factor. The duty cycle and diversity factor accordingly permit a large number of operators to successfully conduct welding operations from a single source of power in an expeditious manner. As mentioned previously, this type of operation is quite practical for shipbuilding, and is also well suited for use in central station power plant constructions or oil refinery and oil storage tank construction or erection, or in large boiler and pipe jobs.

In order to successfully obtain the desired parallel operation, it is necessary to provide electrical distribution devices which have one or more inlets and include a plurality of outlets from which many different individual welders may operate. The present invention provides such an electrical distribution device, and incorporates a novel construction wherein a body means is formed of molded rubber-like material having embedded therein electrical inlets and outlets interconnected to one another by a suitable bus bar embedded in the body means. Each of the electrical inlets and outlets is surrounded by an integral portion of the body means provided with a reverse tapered surface for engaging a correspondingly tapered member when a cable is attached to the invention device.

The present invention employs a very effective interlocked means for engaging a cable end with the device, and in addition protective cap members are associated with the body means for insertion over the various inlets and outlets to protect them from the accumulation of moisture adjacent thereto.

It is evident that the rubber-like material employed in the body means is quite a good electrical insulator, and is preferably of an oil resistant type so as to stand up in operation around corrosive areas as are frequently encountered in construction projects. The body means according to the present invention is preferably substantially rectangular in shape, thereby providing an opening in the center thereof which facilitates handling of the unit, and in addition permits it to be conveniently lashed in position wherever the welding operations are to be conducted. The arrangement according to the present invention provides a compact arrangement from which many cables may extend in various directions for fitting different individual welding units. The novel construction of the device provides a very rugged unit with a minimum of maintenance problems, and it is very easy to attach cables thereto or remove cables therefrom. The central opening in the body means further serves to reduce the weight of the apparatus, and provides a high degree of cooling for the electrical components which are apt to heat up during extended operation.

An object of the present invention is to provide a new and novel electrical distribution device which provides a compact arrangement for distributing electricity to a plurality of locations from a central point.

Another object of the invention is the provision of an electrical distribution device which is well insulated and highly oil resistant, and which is very rugged in operation.

A further object of the invention is to provide an electrical distribution device wherein the weight is substantially reduced and which is easy to handle and further wherein the cooling of the components thereof is facilitated.

Yet another object of the invention is to provide an electrical insulation device wherein the inlets and outlets are protected from damage and accumulation of moisture, and which is quite simple and inexpensive in construction.

Other objects and many attendant advantages of the present invention will become more apparent when considered in connection with the accompanying specification and drawings wherein:

FIG. 3 is an end view of the device shown in FIG. 1;

FIG. 4 is an enlarged view of the device shown in FIG. 1 partly broken away to illustrate certain details of construction;

FIG. 6 is a view of a cable end employing a female connector adapted to cooperate with the male connectors of the device;

FIG. 7 is a view of a cable end employing a male connector adapted to fit within the female connectors of the device;

FIG. 8 is a sectional view of one of the protective caps according to the present invention;

FIG. 9 is a sectional view of another cap;

FIG. 10 is a sectional view of still another cap employed with the invention apparatus;

FIG. 11 illustrates the anchor member employed with the invention;

FIG. 12 is a plan view, partly broken away, illustrating a modification of the device;

FIG. 13 is an end view of the device shown in FIG. 12; and

FIG. 14 is a cut-away sectional view of a portion of a device similar to that shown in FIG. 4 according to a modification of the invention.

Figure 1:
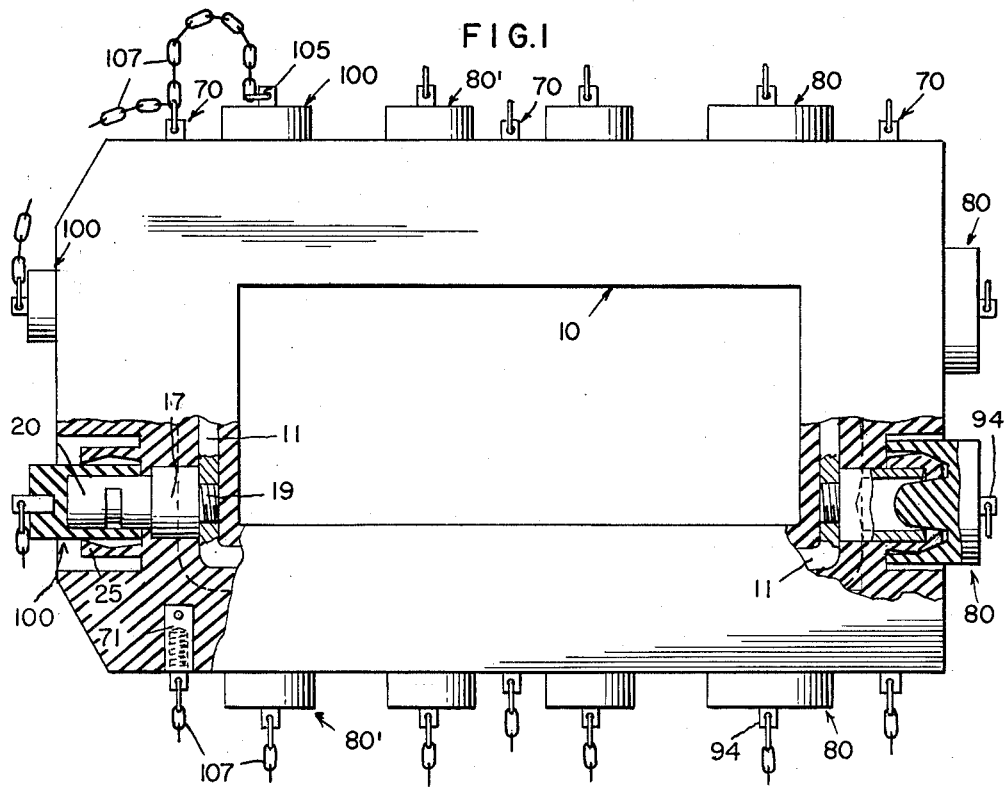
FIG. 1 is a top plan view of the device according to the present invention.

Referring now to the drawings wherein like reference characters designate corresponding parts throughout the several views, there is shown in FIGS. 1–4 a body means 10 according to the present invention formed of molded relatively hard rubber-like material having a substantial rectangular configuration whereby an opening is formed through the central portion thereof. As seen most clearly in FIG. 4, a substantially rectangular bus bar indicated generally by reference numeral 11 is embedded in the body means in surrounding relationship to the central opening formed therethrough. Bus bar 11 is substantially L-shaped in cross-section, and includes integral legs 11' and 11" which are disposed at substantially right angles to one another. This particular construction of the bus bar serves to rigidify the bus bar and strengthen the overall construction such that if the body is dropped accidentally upon a hard surface, the L-shaped bus bar tends to resist deformation and bending of the structure.

Leg portion 11' of the bus bar has a plurality of threaded openings 12 formed therethrough and spaced throughout the length thereof. A pair of electrical inlets 14 and 15 is embedded in one end of the body means and comprise enlarged cylindrical body portions 16 and 17 having reduced threaded end portions 18 and 19 respectively formed at one end thereof. Threaded portions 18 and 19 are threaded within corresponding openings formed in the bus bar and are silver soldered thereto in order to provide a permanent rigid interconnection therebetween.

Figure 5:
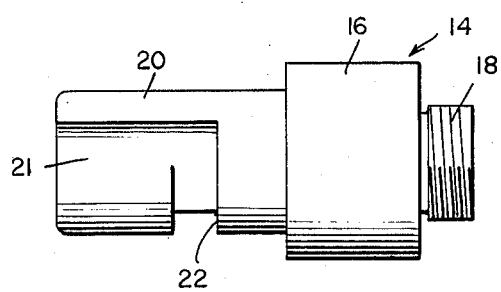
FIG. 5 is an enlarged view of one of the inlet connectors of the apparatus.

Each of inlets 14 and 15 is provided with an integral reduced portion 20 as seen more clearly in FIG. 5, portion 20 being substantially cylindrical and having a cut-out flattened portion 21 extending along the axis of the member and connected at the inner end thereof with a circumferentially extending slot 22 which extends partially around the outer periphery of cylindrical portion 20.

As seen most clearly in FIG. 4, each of inlets 14 and 15 is recessed within the enlarged end portion 23 of the body, this enlarged end portion including sloping surfaces 24 connected to the adjacent side surfaces of the body for conserving material. This enlarged end portion serves to protect the outer ends of the reduced portions 20 of inlets 14 and 15 to prevent damage thereto during use of the apparatus.

The inlets 14 and 15 are disposed within similar substantially cup-shaped recesses 25. Within each of the cup-shaped recesses 25 in an annular flexible shoulder 27 the outer surface of which is spaced from the inner wall of the recess 25. Shoulders 27 are integral with the body, and the inner surface thereof is sloping and connects with another sloping surface formed integral with the body to define a reversely tapered surface indicated by reference numeral 26, this reversely tapered surface being adapted to cooperate with a correspondingly reversely tapered surface secured to the end of a cable for providing a water-tight seal with the end of the cable. The relatively thin flexible shoulder portion 27 ensures ready insertion of the tapered surface formed on the end of a cable and additionally ensures a good seal therewith.

Referring now to FIG. 6, a cable 30 has secured to the outer end thereof a metallic connector 31 having a reduced hollow thimble portion 32 which is crimped upon the outer end of the cable for securely fastening the connector thereto. Metallic connector 31 defines a cylindrical recess 33 having a substantially hemi-spherical projection 34 extending radially into the recess. An insulating sleeve 35 surrounds the outer end of the cable and has the rear portion 36 secured to the cable as by vulcanizing or the like to provide a permanent seal and interconnection therebetween. The forward end of sleeve 35 is provided with a reduced portion 37 having a reversely tapered outer surface 38 of complementary configuration to the reversely tapered surface 26 of portions 25 surrounding inlets 14 and 15 of the electrical distribution device.

When it is desired to connect suitable electrical cables 30 to inlets 14 and 15, the reduced end portions 37 of the sleeves 35 surrounding the cables are inserted within portions 25 of the body means to provide the desired seal, and projections 34 are adapted to travel along cut-out portions 21 of the inlets, and then upon rotation of the cable ends with respect to the inlets, projections 34 ride up within circumferential slots 22 of the inlets to provide a positive interconnection therebetween for preventing the cables from becoming disconnected from inlets 14 and 15. The inlet cables 30 can be connected to any suitable source of electrical energy, preferably to a constant potential source such as provided with a transformer and rectifier arrangement. A pair of inlets and inlet cables is employed according to the present invention due to the fact that two cables of a given size are adapted to carry a substantially greater load than one cable of twice the size of one of the pair of cables. In this manner, a substantially greater amount of amperage may be conducted to the distribution device while utilizing the same total cross-sectional area of inlet cables.

Referring again to FIG. 4, a plurality of similar outlets are connected to the bus bar at spaced points therealong, three smaller outlets 40 being provided at opposite sides of the body means and a pair of larger outlets 41 being disposed at opposite sides of the bus bar adjacent one end thereof, another similar pair of large outlets 42 being provided at the end of the body means opposite from that in which the inlet means are embedded. Each of the outlet means 40–42 is also embedded within the body means as are the inlets, and each of the outlets embedded in the body means is of substantially the same configuration, the only difference being in the relative dimensions thereof.

Each of the outlets 40–42 comprises a metallic connector 45 having a cylindrical recess 46 formed therein, the outer end 47 of the various connector members terminating at a point disposed inwardly of the outer surface of the body means. A substantially hemi-spherical projection 48 is formed on the inner wall of each of recesses 46 and extends radially therein. Each of connectors 45 is also provided with a reduced threaded end portion 49 which is threaded within a correspondingly threaded opening in the bus bar and silver soldered thereto in order to provide a permanent and secure interconnection therebetween.

Each of connectors 45 of the outlets is surrounded by an integral portion 50 of the body means having a reversely tapered outer surface 51 adapted to cooperate with a correspondingly reversely tapered surface on the end of a cable connector for providing a fluid tight seal therewith. A substantially cylindrical wall portion 52 of the body means is spaced from the reversely tapered surface 51 and defines an annular recess 53 therebetween adapted to receive the insulating sleeve connected to the cooperating cable.

Referring now to FIG. 7, a cable 60 has a metallic connector 61 secured to the outer end thereof by means of a reduced thimble portion 61' formed integral with the connector and crimped to the outer end of the cable. Connector 61 includes a reduced cylindrical portion 62, the forward end of which is provided with a cut-out flattened portion 63, the rear end of which is in communication with a circumferentially extending slot 64 extending partially around reduced portion 62. It is apparent that the outer end portion of metallic connector 61 is similar to the outer end portion of each of connectors 14 and 15 as seen most clearly in FIG. 5. In addition to the aforedescribed structure, the outer end portions of each of inlets 14 and 15 as well as the outer end portions of the connectors 61 secured to the cables are provided with a diametrically extending slot indicated by reference numeral 65 as seen in FIG. 3 which illustrates the end portions of inlets 14 and 15. These diametrically extending slots provide resilience for the outer end portions of the inlets and cable connectors such that they are adapted to be slightly compressed toward one another to provide a tight frictional fit with the cooperating female member.

Referring again to FIG. 7, the outer end of the cable 60 and the connector 61 are surrounded by an insulating sleeve 66, the rear end 67 of which is connected to the outer insulation of the cable by suitable means such as vulcanizing or the like. The forward portion of sleeve 66 is provided with a central recess 68 having a reversely tapered surface 69 corresponding to the reversely tapered surface 51 or portions 50 surrounding each of the outlets. It is accordingly apparent that when it is desired to connect a cable to any one of the various outlets, a cable 60 is secured thereto by inserting reduced end portions 62 of the connectors within the connectors 45 of the outlets whereby projections 48 ride along cut-out portions 63, and then upon relative rotation of the cable end and the outlets, projections 48 ride up within circumferential slots 64 in the cable connectors. At the same time, the reversely tapered outer surface 51 of portions 50 of the body means cooperates with the reversely tapered surface 69 of the sleeve 66 of the cable for providing an effective fluid tight seal therewith. In this manner various cables may be connected to the different outlets to provide a rigid interconnection therebetween. It is apparent that when cables are connected either to the inlets or outlets of the distribution device, a very good electrical connection will be made therebetween while at the same time maintaining an effective fluid tight seal between the cable ends and the body means of the distribution device, such interconnection also being very well insulated to prevent the leakage of electricity therefrom.

It is apparent that six smaller outlets are provided and four larger outlets are provided in the device as disclosed. While the specific number of large and small outlets may be varied in accordance with the distribution requirements, it has been determined that in most average installations where the device is employed, for example, in shipbuilding and the like, the two large outlets of the body means opposite the inlets will often be employed for feeding power to another similar outlet spaced therefrom. The other large outlets may be, in turn, connected to smaller type outlets as hereinafter described, or to various other distribution members to which it is desired to conduct a relatively large load. The smaller outlets will generally be employed for distributing current to individual welding apparatus, and obviously are not required to carry larger loads thereby requiring smaller size cables and correspondingly smaller size connector means. It is evident that the device according to the present invention provides great versatility since from the single central location of a device as shown in FIG. 4, cables may be connected in many different directions to various other devices to which it is desired to conduct welding current. It is also apparent that the device may be made in various other configurations than rectangular as shown, but the rectangular shape is considered preferable since it provides a very compact arrangement for distributing power in different directions and enables many cables to be placed therearound without interfering with one another.

Anchor members 70 are embedded in the body means, three of the anchor members being disposed at spaced points on either side of the body means. Referring to FIG. 11, one of the anchor means is shown in greater detail and comprises a substantially cylindrical solid member 71 having a bar 72 extending through an opening 73 formed adjacent one end thereof and projecting laterally on either side of cylindrical portion 71. The opposite end of anchor member 70 is provided with a drilled and tapped opening 74. Each of members 70 is embedded in the body means, bar 72 serving to firmly anchor it therein and to prevent rotation thereof with respect to the body means.

Referring to FIG. 8, a protective cap 80 comprises a substantially cup-shaped body portion 81 having a cylindrical side wall 82 which flairs into a tapered wall 83 intersecting the bottom wall 84 of the recess defined by the cup-shaped member. A tapered projection 85 extends from bottom wall 84 toward the open end of the protective cap and terminates in a rounded outer end portion 86. A tubular member 90 is embedded within the body member and extends adjacent the rounded end portion 86 of projection 85, tubular member 90 being provided with an opening 91 extending laterally therethrough such that when the tubular member is molded into the cap, it will be firmly interconnected therewith due to the material of the projection being disposed within opening 91. The interior of tubular member 90 is threaded adjacent the end 92 thereof and an anchor pin 93 is provided with a threaded shank portion threadedly engaged within tubular member 90 and has an enlarged head 94 with an opening 95 formed therethrough.

It is apparent that pin 93 may be quickly inserted or removed from tubular member 90, and the opening formed through the head thereof is adapted to receive one end of a flexible connector such as a link or the like, the opposite end of which is provided with a similar pin 93 which, in turn, may be secured within the threaded openings formed in anchor member 70. In this manner, protective cap 80 may be secured to anchor member 70 for connecting the protective cap to the body means at all times.

The protective cap 80, as shown in FIG. 8, is adapted to fit over one of the outlets 41 or 42, the tapered surface 83 cooperating with the reversely tapered surfaces 51 of the body portion surrounding the outlets for providing a fluid tight seal therebetween. At the same time, projection 85 extends within the central opening defined by portions 50 of the outlets and downwardly within the recess 46 defined within the metallic connectors 45 thereof. Protective cap 80 accordingly provides an effective means for covering and protecting the outlets when cables are not secured thereto, and prevents moisture from accumulating therein, thereby reducing corrosion of the outlets when not in use.

As seen in FIG. 9, a smaller protective cap 80' similar to protective cap 80 is shown, cap 80' being adapted to fit over the smaller outlets 40. The construction of cap 80' is substantially the same as cap 80, similar parts being provided with the same reference numerals primed as the cap 80 shown in FIG. 8. It is apparent that cap 80' differs from cap 80 in that the projection 85' is of slightly different configuration and projects substantially beyond the lower surface 99 of cap 80'.

Referring now to FIG. 10, still another protective cap 100 is disclosed and comprises a substantially cup-shaped body portion 101 having a cylindrical recess 102 formed in one end thereof. A tubular member 103 is embedded within body member 101 and a threaded anchor pin 104 is received within the threaded interior of tubular member 103, head 105 having an opening 106 extending therethrough. Protective cap 100 is adapted to fit over inlets 14 or 15 in order to protect the outer ends of the cylindrical connector portions 20 thereof when not in use and, in addition, to prevent the accumulation of moisture therearound. In this connection, protective cap 100 may be eliminated by extending portions 25 of the body means outwardly beyond the ends of cylindrical portions 20 of inlets 14 and 15, and in certain instances, this particular arrangement is considered preferable since it provides constant protection for the outer ends of inlets 14 and 15.

Figure 2:
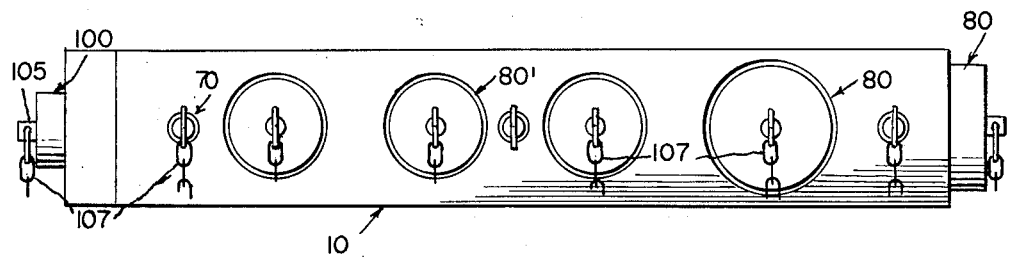
FIG. 2 is a side view of the device shown in FIG. 1.

It is contemplated that a pair of protective caps will be connected to each of anchor members 70 by means of flexible chains 107 or the like whereby a protective cap will be provided for each of the inlets and outlets of the distribution device. As shown in FIGS. 1 and 2, each of the various protective caps 80 and 80' and 100 are shown in operative position about the inlets and outlets of the body means thereby affording complete protection thereof while not in use.

Referring now to FIGS. 12 and 13, a modification of the device is disclosed wherein the body means 110 is considerably smaller than that disclosed in FIGS. 1-4 and is provided with a single inlet 114 identical in all respects with inlet 14 shown in FIG. 1. Inlet 114 is recessed within the enlarged end portion 123 of the body and this end portion is provided with sloping walls 124 connected with the side walls of the body for conserving material. A cup-shaped recess 125 is provided in the enlarged end portion of the body, and an annular flexible shoulder 127 is formed integral with the body and spaced from the inner wall of recess 125. The inner surface of shoulder 127 defines with the body a reversely tapered surface indicated generally by reference numeral 126, the purpose and function of shoulder 127 being identical with that of shoulder 27 described in connection with FIG. 4.

A bus bar indicated generally by reference numeral 111 is of generally rectangular configuration, and is embedded within the body means. Bus bar 111 is of substantially L-shaped cross sectional configuration, being provided with integral leg portions 111' and 111''. This construction serves to strengthen and rigidify the structure of the apparatus. A plurality of outlets 140 identical in all respects with the outlets 40 of the device shown in FIG. 4 are secured to leg portion 111' of the bus bar.

A pair of anchor members 170 is identical with anchor members 70 of the device shown in FIGS. 1-4 and each is adapted to be connected to suitable cap members similar to the cap members shown in FIGS. 9 and 10 for protecting various inlet and outlet members. The device shown in FIGS. 12 and 13 operates in a manner similar to that of the device shown in FIGS. 1-4, only a single inlet being provided since it represents a distribution device at the end of the distribution line whereby it is not required to carry the large loads carried by the previously described device. The primary advantage of the device shown in FIGS. 12 and 13 is the fact that it is a very small and compact unit from which six individual welders may operate for example, and will ordinarily be used where only individual welding operations are required rather than utilizing the larger distribution device shown in FIGS. 1-4 which is used at intermediate points in the distribution network for distributing power to other distribution means such as is shown, for example, in FIGS. 12 and 13. The construction of the device shown in FIGS. 12 and 13 is considered to be obvious since it is quite similar to that of the device shown in FIGS. 1-4, and accordingly the individual components thereof have not been described in detail, although as mentioned previously, these components are substantially identical to those shown in the device illustrated in FIGS. 1-4 of the drawings.

Referring now to FIG. 14, a modification of the device is illustrated which is identical in all respects to that shown in FIG. 4 with the exception that the reversely tapered surfaces surrounding the inlets and outlets have been modified. In place of the reversely tapered surface 26 surrounding inlet 20 of the device shown in FIG. 4, an arcuate surface 26' is provided in surrounding relationship to inlet 20' and is adapted to cooperate with a cable end similar to that shown in FIG. 6 wherein the reversely tapered surface 38 is replaced by an arcuate surface complementary to arcuate surface 26'. In a like manner, the reversely tapered surfaces 51 surrounding the outlets 40 of the device shown in FIG. 4 are replaced by arcuate surfaces 51' surrounding outlets 40' of the modified device. The arcuate surfaces surrounding the outlets are adapted to cooperate with a cable end as shown in FIG. 7 wherein the reversely tapered surface 68 is replaced by an arcuate surface complementary to that of arcuate surface 51'. The cooperating arcuate surfaces provide a very effective fluid-tight seal between the cable ends and the body means of the device.

It is apparent from the foregoing that there is provided a new and novel electrical distribution device which is especially adapted for use in constant potential multi-operator type welding systems. The device is well insulated and oil resistant, and is quite rugged in construction so as to withstand rough treatment as often occurs in welding operations. The device is easy to handle and is especially well adapted to be lashed in position on the job, and provides an arrangement wherein the weight is reduced to a minimum and a maximum cooling effect is obtained. The device provides a central point for distributing power in many directions thereby conserving space, and cables may be quickly and easily attached thereto or removed therefrom. Means is also provided for protecting the various inlets and outlets when not in use, thereby reducing maintenance problems of the device to a minimum. The device is quite simple and inexpensive in construction and yet is very sturdy and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. An electrical distribution device comprising an integral body means of molded electrical insulating material being of substantially rectangular configuration and including outer surfaces and inner surfaces, said inner surface defining a substantially rectangular relatively large opening in the central portion of the body means, an elongated bus bar embedded within said body means, said bus bar being substantially rectangular and being disposed adjacent to said inner surface and spaced therefrom by an integral portion of said body means, said bus bar extending completely around the central opening in the body means to assist in reinforcing such opening, a pair of electrical inlets each permanently embedded in and bonded to the insulating material of the body means and each of which includes a metallic connector portion having an inner end portion and an outer end portion, the inner end portion of each of said electrical inlets being electrically connected to a portion of said bus bar, the outer end portions of each of said electrical inlets being spaced inwardly of one of the outer surfaces of said body means and being in communication therewith, said body means including a substantially cup-shaped recess formed in said last-mentioned outer surface in surrounding relationship to each of said electrical inlets, said body means also including an integral relatively thin flexible annular shoulder member in spaced surrounding relationship to each of said inlets and disposed in spaced relationship from the inner wall of the associated cup-shaped recess, the inner surface of each of said shoulder members defining a reversely tapered surface for receiving a correspondingly tapered member to provide a fluid-tight interconnection therewith, a plurality of separate electrical outlets permanently embedded in and bonded to the insulating material of said body means, each of said electrical outlets including an inner end portion electrically connected with said bus bar and an outer end portion spaced inwardly of one of said outer surfaces of said body means and being in communication therewith, said electrical outlets being spaced about said body means and opening through various outer surfaces thereof, said body means including a substantially cup-shaped recess formed in the outer surfaces thereof in surrounding relationship to each of said electrical outlet means, each of said electrical outlet means being surrounded by an integral body portion defining on the outer surface thereof a reversely tapered annular surface disposed in spaced relationship from the inner wall of the associated cup-shaped recess.

2. Apparatus as defined in claim 1, including protective cap means, said cap means comprising a substantially cup-shaped member adapted to cooperate with one of said outlet means and having a tapered inner surface adapted to engage a correspondingly tapered integral body portion surrounding said electrical outlet means, said cap means having formed on the inner surface thereof a central protuberance projecting into the cavity defined within the cap means for extending into a portion of one of said outlet means, a tubular member embedded within said cap means and having threads formed within a portion thereof, an anchor member threadedly disposed within said threaded portion, and flexible interconnecting means having one end thereof secured to said anchor member and the opposite end thereof connected to said body means for connecting said cap means to said body means.

References Cited in the file of this patent

UNITED STATES PATENTS

| | | |
|---|---|---|
| 2,087,384 | Lee | July 20, 1937 |
| 2,677,115 | Stevens | Apr. 27, 1954 |
| 2,742,622 | Stevens | Apr. 17, 1956 |
| 2,882,509 | Archer et al. | Apr. 14, 1959 |
| 2,907,973 | Stevens | Oct. 6, 1959 |